(12) United States Patent
Kodama (10) Patent No.: US 8,110,174 B2
(45) Date of Patent: Feb. 7, 2012

(54) REACTIVE WORKING MATERIAL FOR USE IN HYDROGEN PRODUCTION BY DECOMPOSITION OF WATER

(75) Inventor: Tatsuya Kodama, Niigata (JP)

(73) Assignee: Krosakiharima Corporation, Fukuoka (JP)

(*) Notice: Subject to any disclaimer, the term of this patent is extended or adjusted under 35 U.S.C. 154(b) by 0 days.

(21) Appl. No.: 12/590,672

(22) Filed: Nov. 12, 2009

(65) Prior Publication Data

US 2010/0119441 A1 May 13, 2010

Related U.S. Application Data (63) Continuation of application No. 11/662,127, filed as application No. PCT/JP2004/012997 on Sep. 7, 2004, now abandoned.

(51) Int. Cl.
*C01B 3/24* (2006.01)
*C01B 3/26* (2006.01)

(52) U.S. Cl. ............ 423/650; 423/652; 423/594.1; 423/633

(58) Field of Classification Search ............ 423/650
See application file for complete search history.

(56) References Cited

U.S. PATENT DOCUMENTS

2003/0183080 A1* 10/2003 Mundschau ............ 95/55
2004/0152790 A1* 8/2004 Cornaro et al. ........ 518/719

FOREIGN PATENT DOCUMENTS

| EP | 0732428 | * | 9/1996 |
|---|---|---|---|
| JP | 05137995 | * | 6/1993 |
| JP | 2003-060101 | | 2/2003 |
| JP | 2004-269296 | | 9/2004 |

OTHER PUBLICATIONS

Steinfeld, A., Design Aspects of Solar Thermochemical Engineering—A Case Study: Two-Step Wafer-Splitting Cycle Using The Fe3O4/FeO Redox System, Solar Energy, vol. 65, No. 1, pp. 43-53, 1999.*

Yumiko Nakamuro et al., "Hannosei Ceramic ni yoru Mizu no Netsubunkai (3) Tetsu Ganyu Anteika Zirconia ni yoru Nidankai Cycle", CSJ: The Chemical Society of Japan Dai 84 Shunki Nenkai Koen Yokoshu I, Mar. 11, 2004, p. 362, 2 D4-50.

Ryuji Yamamoto et al., "Hannosei Ceramic ni yoru Mizu no Netsu Bunkai (1) Ferrite/ $ZrO_2$ Tanjitai ni yoru Nidankai Cycle", CSJ: The Chemical Society of Japan Dai 83 Shunki Nenkai Koen Yokoshu I, Mar. 3, 2003, p. 31, 3 A3-10.

Ryuji Yamamoto et al., $Co_xFe_{3-x}O_4$ ($0 \leq x \leq 1$)/$ZrO_2$ Tanjitai o Mochiita Nidankai Netsu Kagaku Mizubunkai A Yokoshu, Sep. 18, 2003, p. 28.

(Continued)

*Primary Examiner* — Melvin Mayes
*Assistant Examiner* — Kenneth Vaden
(74) *Attorney, Agent, or Firm* — Jordan and Hamburg LLP (57) ABSTRACT

Disclosed is a reactive working material for use in a process of producing hydrogen by splitting water based on a two-step thermochemical water-splitting cycle through the utilization of solar heat, industrial waste heat or the like, which comprises a ferrite fine powder and a cubic zirconia supporting the ferrite fine powder. This reactive working material makes it possible to prevent scaling off of the ferrite fine powder from the zirconia fine powder due to volumetric changes of the ferrite fine powder during repeated use, and suppress growth of FeO grains due to repetition of melting and solidification when used as a reactive working material for a cyclic reaction under a high temperature of 1400° C. or more.

8 Claims, 6 Drawing Sheets

OTHER PUBLICATIONS

Yoshiyasu Kondo et al., "Kinzoku Sankabutsu redox Shokubai ni yoru Taiyonetsu/ Suiso Energy Tenkan", Dai 90 Kai Shokubai Toronkai A Yokoshu, Sep. 10, 2002, p. 22.

R. Amir et al., Design Development of Iron Solid Reactants in the UT-3 Water Decomposition Cycle Based on Ceramic Support Materials, Int. J. Hydrogen. Energy, 1993, vol. 18, No. 4, pp. 283 to 286.

* cited by examiner

2θ (Cu-K$_\alpha$) / (degree)

REACTIVE WORKING MATERIAL FOR USE IN HYDROGEN PRODUCTION BY DECOMPOSITION OF WATER

This is a Continuation application of U.S. Ser. No. 11/662,127 filed May 12, 2007, now abandoned, which is a National Stage Application of PCT/JP2004/012997 filed Sept. 7, 2004.

TECHNICAL FIELD

The present invention relates to a technique of producing hydrogen by splitting water through the utilization of solar heat, industrial waste heat or the like, and more particularly to a hydrogen production process based on a two-step thermochemical water-splitting cycle and a reactive working material for use in the hydrogen production process.

BACKGROUND ART

A hydrogen production process based on a two-step thermochemical water-splitting cycle has been widely known before the filing of this patent application. The hydrogen production process is designed to repeat the following two reaction formulas.

First Step

Second Step

Specifically, this hydrogen production process comprises a first step of reducing a metal oxide MOox to form a reduced metal oxide MOred and produce oxygen through a high-temperature thermal decomposition reaction, and a second step of reacting the reduced metal oxide with water to oxidize the reduced metal oxide to a metal oxide and produce hydrogen.

Typically, magnetite $Fe_3O_4$, which is known and described as "iron-based oxide" or "ferrite", is used as the metal oxide MOox, i.e., a reactive working material for the hydrogen production process. This iron-based oxide as the reactive working material is reduced to wustite FeO in the first step to release oxygen, and the wustite FeO is reacted with water in the second step to release hydrogen and return to magnetite $Fe_3O_4$. Then, the reactive working material will be reused.

In the above reaction formulas, the process of releasing oxygen in the first step is generally required to perform under a high-temperature atmosphere of 1800 to 2300° C. In practice, under such a high-temperature atmosphere for the oxygen release reaction, the iron-based oxide is sintered to be deactivated and cause quite strong vaporization. Therefore, it is required to quench the vaporized substance, and this requirement makes it difficult to put the two-step thermochemical water-splitting cycle to practical use.

With a view to solve the problem concerning the reactive working material for use in the hydrogen production process based on the two-step thermochemical water-splitting cycle, the applicant of this patent application previously disclosed a hydrogen production process based on a two-step thermochemical water-splitting cycle which uses a reactive working material comprising ferrite fine powder and zirconia fine powder supporting the ferrite fine powder, in Japanese Patent Application No. 2003-060101.

This reactive working material is formed such that ferrite fine powder is supported on zirconia fine powder. The zirconia fine powder is hardly sintered even at high temperatures, and the ferrite fine particles supported on the zirconia fine powder is prevented from coming in close contact with other ferrite particles each other so as to suppress grain growth thereof to provide enhanced reactivity and reusability even at a relatively low temperature of 1400° C. or less.

$Fe_3O_4$ and FeO to be repeatedly formed during the reaction cycle have specific gravities of 5.2 and 5.7, respectively. Thus, due to volumetric changes of these powders during the reaction cycle, the ferrite fine powder will scale off from the zirconia fine powder to spoil the zirconia powder's effect of suppressing grain growth in the ferrite fine powder. Moreover, under a reaction atmosphere repeatedly having a temperature of 1400° C. or more which is greater than a melting point of FeO, the ferrite fine powder will be gradually agglomerated to cause grain growth while repeating melting and solidification, resulting in deterioration of reaction efficiency.

DISCLOSURE OF THE INVENTION

In a reactive working material for use in a hydrogen production process based on a two-step thermochemical water-splitting cycle, which comprises ferrite and zirconia supporting the ferrite, it is an object of the present invention to provide an effective means for preventing the ferrite from scaling off the zirconia due to volumetric changes of the ferrite during repeated use.

It is another object of the present invention to provide a means for suppressing growth of FeO grains due to repetition of melting and solidification when used as a reactive working material for a cyclical reaction under a high temperature of 1400° C. or more.

In order to achieve the above objects, the present invention provides a reactive working material for use in a two-step thermochemical water-splitting cycle, which comprises ferrite and zirconia supporting the ferrite, wherein the zirconia supporting ferrite is a cubic zirconia.

As used in this specification, the "ferrite" means an oxide represented by a composition formula of $M(II)O \cdot Fe_2O_3$, wherein M(II) is a divalent metal, such as Fe, Mn, Co, Mg, Ni, Zn or Cu. The oxide constituting the ferrite may have any configuration. For example, $Fe_3O_4$ having a spinel crystal structure may be used. The divalent metals, such as Mn, Co or Mg, may be effectively doped as ions by replacing ferrous ion in $Fe_3O_4$ partially or all. When used in the form of a fine powder, the ferrite is prepared to have a particle size, preferably, of 10 μm or less, more preferably 1 μm or less.

Further, the "cubic zirconia" means a fully-stabilized zirconia or a partially-stabilized zirconia which contains a stabilizer, such as calcia or yttria, and a zirconia including a cubic crystal phase. Preferably, the cubic zirconia contains yttria or calcia in an amount of 2 mol % or more. If the content rate of the stabilizer is less than 2 mol %, the suppression of grain growth in the ferrite will become insufficient. An excessive content rate of the stabilizer causes deterioration in reactivity. Thus, more preferably, an upper limit of the content rate is set at 25 mol % or less.

In the present invention, the reactive working material comprising a ferrite and a zirconia supporting the ferrite may be formed as a ferrite/zirconia composite powder. Alternatively, the reactive working material may be formed as a ferrite-supporting porous zirconia ceramics. In this case, a ferrite fine powder may be coated on, i.e., supported on, a porous structure of a porous zirconia ceramics.

The ferrite/zirconia composite powder may be prepared by the following specific method.

As one example, a method using an aqueous Fe(II) salt solution may be employed. Specifically, an yttria fully-stabilized or partially stabilized zirconia fine powder or a calcia fully-stabilized or partially stabilized zirconia fine powder which has a particle size of 10 μm or less, preferably 1 μm or less, is dispersed in an aqueous Fe(II) salt solution or an aqueous Fe(II) salt solution containing another metal salt dissolved therein as a doping metal [M(II)], and an aqueous alkali hydroxide solution is added to the zirconia fine powder-dispersed aqueous solution to form a Fe(II) hydroxide colloid therein. Then, air is bubbled in the colloid-containing aqueous solution to oxidize the Fe(II) hydroxide colloid. Then, a dissolution-precipitation reaction where the Fe(II) hydroxide colloid is dissolved in the zirconia fine powder-dispersed aqueous solution and then precipitated as a ferrite is promoted to grow $Fe_3O_4$ or $M_xFe_{3-x}O_4$ on the dispersed zirconia fine powder so as to form a ferrite/zirconia composite powder.

As another method for preparing the ferrite/zirconia composite powder, a solvent impregnation process may be used. Specifically, a fully-stabilized or partially-stabilized zirconia fine powder is dispersed in an aqueous solution of a metal salt, such as iron nitrate, iron chloride or organic iron, and a salt of the doping metal. The obtained mixture is evaporated and dried, and then the dried mixture is burnt to allow the metal salt on the zirconia to be decomposed to the metal oxide. Then, the metal oxide is heated under a $H_2/H_2O$ mixed gas atmosphere or a $CO/CO_2$ mixed gas atmosphere at a temperature of 300° C. or more.

The porous zirconia ceramics supporting the ferrite may be prepared by immersing a porous zirconia ceramics including a cubic crystal phase into the above aqueous Fe(II) salt solution or the above aqueous Fe(II) salt solution containing another metal salt dissolved therein as a doping metal [M(II)], drying the pulled-out porous zirconia ceramics body, and subjecting the dried porous zirconia ceramics to a heat treatment. In the same manner, a reactive working material having a ferrite fine powder coating can be prepared using a cubic zirconia having any other configuration.

When a reaction temperature is increased up to 1300 to 1500° C., the ferrite fine powder supported on the zirconia is formed as FeO through release of oxygen therefrom. Subsequently, when the reaction temperature is decreased to 1000° C. and water vapor is introduced, FeO returns to the original $Fe_3O_4$ through oxidization while decomposing water to generate hydrogen.

In the above process using the fully-stabilized cubic zirconia, during the course of the formation of FeO at the high temperatures, FeO is incorporated into the zirconia as a solid solution to form a cubic zirconia containing iron ions in the zirconia lattice. In this case, even during the course of the oxidization to $Fe_3O_4$ as well as that of the thermal reduction of $Fe_3O_4$, it is impossible that FeO particles supported on the zirconia fine power scale off the zirconia support and exist as independent grains since FeO phase is not formed anymore as the reduced iron-based oxide.

In the partially-stabilized cubic zirconia, while tetragonal and monoclinic crystal phases exist as a zirconia crystal together with a cubic crystal phase, the zirconia formed as a solid solution with FeO stabilizes the cubic crystal phase to allow the entire crystal phase to have a transition to a cubic zirconia.

As above, at a high reaction temperature of 1300 to 1500° C., $Fe_3O_4$ and cubic zirconia are changed to FeO-zirconia solid solutions through release of oxygen therefrom. Then, when the reaction temperature is reduced to 1000° C. and water vapor is introduced, iron ions in the solid solution of the cubic stabilized zirconia are oxidized while generating hydrogen, and a $Fe_3O_4$ fine powder is precipitated on the cubic zirconia.

That is, in the hydrogen production process based on the two-step thermochemical water-splitting cycle, a first step where a solid solution of FeO and cubic zirconia is formed at high temperatures, and a second step where a $Fe_3O_4$ fine powder is precipitated from the solid solution of cubic zirconia incorporating iron ions and formed directly on the cubic zirconia during decomposition of water at low temperatures, will be repeatedly performed.

A temperature allowing the cubic solid solution of FeO and zirconia to be fully molten is 2000° C. or more when a ratio of FeO to the solid solution is 30 wt % or less. Thus, the solid grains are not excessively molten during the cyclic reaction, and grain growth is suppressed. That is, FeO is not changed to independent grains, and therefore an undesirable situation where FeO grains are molten and agglomerated at about 1400° C., i.e., a melting point thereof, can be avoided to suppress grain growth.

In addition, FeO incorporated in the zirconia as a solid solution is penetrated into and strongly bonded with the zirconia crystal to eliminate the problem about scaling off of the ferrite fine grains from the zirconia fine grains due to volumetric changes, i.e., a large difference in specific gravity between $Fe_3O_4$ as a reactive working material and FeO to be formed through the reaction.

Thus, a fully-stabilized or partially-stabilized cubic zirconia used as a zirconia fine powder for supporting a ferrite fine powder makes it possible to eliminate the problem about scaling off of the ferrite fine powder from the zirconia fine powder as in a case of using a monoclinic zirconia as a support, and achieve an effect of preventing excessive sintering of the ferrite fine powder.

In the present invention, a hydrogen production process using the ferrite supported on the fully-stabilized or partially-stabilized zirconia is performed according to the following reaction formulas.

In the use of an yttria fully-stabilized or partially-stabilized zirconia:

In the use of a calcia fully-stabilized or partially-stabilized zirconia:

The present invention provides the following advantages.

A crystal growth of the iron-based oxide as the reactive working material can be suppressed to maintain cyclical reactivity.

The oxygen-releasing temperature is reduced in the second reaction step since the grain growth of the iron oxide particles is effectively suppressed. This lower reaction temperature makes it possible to eliminate the need for quenching of the reactive working material and a large-scale facility for the quenching.

Thus, a process of converting natural heat energy, such as solar heat, to chemical energy of hydrogen can be achieved.

BEST MODE FOR CARRYING OUT THE INVENTION

An embodiment of the present invention will now be described based on the following Example.

Example 1

An yttria partially-stabilized zirconia (YSZ) represented by $(ZrO_2)_{0.97}$ $(Y_2O_3)_{0.03}$ and a calcia partially-stabilized zirconia (CSZ) represented by $(ZrO_2)_{0.97}$ $(CaO)_{0.03}$ (produced by Kojundo Chemical Lab. Co. Ltd.) were used as a support of a ferrite. Each of the YSZ and CSZ has a particle size of 1 μm or less. The YSZ primarily comprises a cubic crystal phase and slightly has a tetragonal crystal phase. The YSZ has a BET (Brunauer-Emmett-Teller) surface area of 7.7 $m^2g^{-1}$. The CSZ primarily comprises a cubic crystal phase and partially has a monoclinic crystal phase. As Comparative Example, a conventional monoclinic zirconia (BET surface area: 12.6 $m^2g^{-1}$) was used as a support.

A cubic zirconia-supported ferrite as Inventive Example and a monoclinic zirconia-supported ferrite as Comparative Example were prepared through the following process.

The zirconia particles were suspended in distilled water after removing oxygen and $CO_2$ therefrom, and $N_2$ was supplied therethrough for 1 hour to expel any remaining air. Then, a given amount of $FeSO_4$, $MnSO_4$ and $CoSO_4$ were dissolved in the suspension, and 0.15 mol $dm^{-3}$ of NaOH solution was added to the obtained solution to adjust pH at 8.5 so as to form hydroxides of $Fe^{2+}$, $Mn^{2+}$ and $Co^{2+}$. A mass ratio of a ferrite phase to the zirconia is set in the range of 20 to 25%. This mixed solution was heated up to 65° C., and then an NaOH solution was added to the heated solution while supplying air bubbles therethrough, to maintain pH at 8.5. A resulting product was collected by centrifugal separation at 14000 rpm. The collected product was rinsed with distilled water and acetone, and then dried at room temperature all day and night. In advance of a high-temperature reaction, the sample prepared in the above manner was subjected to a high-temperature stabilization treatment under an $N_2$ atmosphere at 900° C. Additionally, as Comparative Example, $Fe_3O_4$ without a zirconia support was prepared through a coprecipitation process.

The obtained samples were identified using an X-ray diffractometer (XRD) (RAD-γ A diffractometer: produced by Rigaku Co. Ltd.). A ferrite phase in each of the samples was dissolved by HCl, and respective amounts of Fe, Mn and Co in the solution were analyzed through inductively coupled plasma (ICP) emission spectrometry (SPS-1500 V: SEIKO Instruments Inc.) to determine a weight ratio of ferrite/zirconia support.

Each of the samples was used in the water-decomposition reaction represented by the aforementioned formulas (1) and (2) or (3) and (4). The reaction represented by the formula (1) or (3) and the reaction represented by the formula (2) or (4) will hereinafter be referred to respectively as "thermal reduction reaction" and "water-decomposition reaction".

Figure 1:
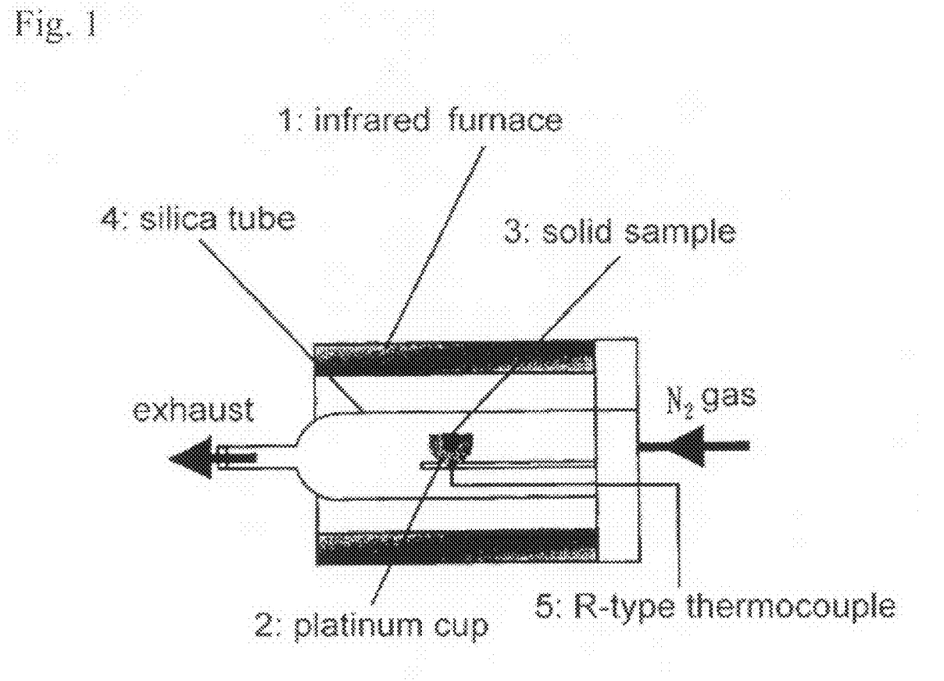
FIG. 1 is a schematic diagram showing a high-temperature thermal reduction reactor used in a test on a reactive working material according to the present invention.

FIG. 1 shows an experimental apparatus for the thermal reduction reaction, which is designed to supply $N_2$ gas to a silica tube 4 which is contained in an infrared furnace 1 to house a platinum cup 2 for receiving the solid sample 3 therein, and exhaust the $N_2$ gas from the silica tube 4.

The solid sample (about 1 g) 3 was put in the platinum cup (diameter: 10 mm, depth: 7 mm) 2, and set in the silica tube (SSA-E45; produced by ULVAC-RIKO, Inc) 4 having an inner diameter of 45 mm. $N_2$ gas (purity: 99.999%) was supplied at a flow rate of 1.0 $Ndm^3 \cdot min$. A temperature of the platinum cup 2 was controlled using an R-type thermocouple 5 disposed in contact with the platinum cup 2 in the infrared furnace (RHL-VHT-E44: produced by ULVAC-RIKO, Inc) 1, and increased up to a given temperature (1400° C.) so as to induce the thermal reduction reaction.

The solid sample 3 was heated at a constant temperature for 0.5 hours, and then cooled to room temperature. After completion of the reaction, the thermally reduced solid sample 3 was crushed using a mortar, and the obtained powder was put in the silica tube 4. Then, $H_2O/N_2$ mixed gas was introduced into the reaction system to induce the water-decomposition reaction. The $H_2O/N_2$ mixed gas was supplied at a flow rate of 4 $Ncm^3 \cdot min^{-1}$ through distilled water having a temperature of 80° C. In this process, a partial pressure of water vapor in the $H_2O/N_2$ mixed gas was estimated as 47% from a vapor pressure at 80° C. and 1 atm.

The reaction system was heated up to 1000° C. within 10 minutes using an infrared furnace (RHL-E45P: produced by ULVAC-RIKO, Inc) 1, and then the water-decomposition reaction was promoted at a constant temperature of 1000° C. for 50 minutes.

In order to measure an amount of hydrogen generated through the water-decomposition reaction, the discharged gas was collected over water to a container. After completion of the water-decomposition reaction, a volume of the collected discharged gas was measured, and gas components were determined using a thermal conductivity detector (TCD) gas chromatography (GC-4C: produced by Shimadzu Corp.). Each of the samples was identified using the XRD (RAD-γ A diffractometer: produced by Rigaku Co. Ltd.).

Further, in order to check repeatability of the cyclical reaction, the thermal reduction reaction and the water-decomposition reaction using the ferrite/zirconia composite powder were alternately repeated two to seven times. After completion of each cycle, the thermally reduced sample was crushed using a mortar.

Figure 2:
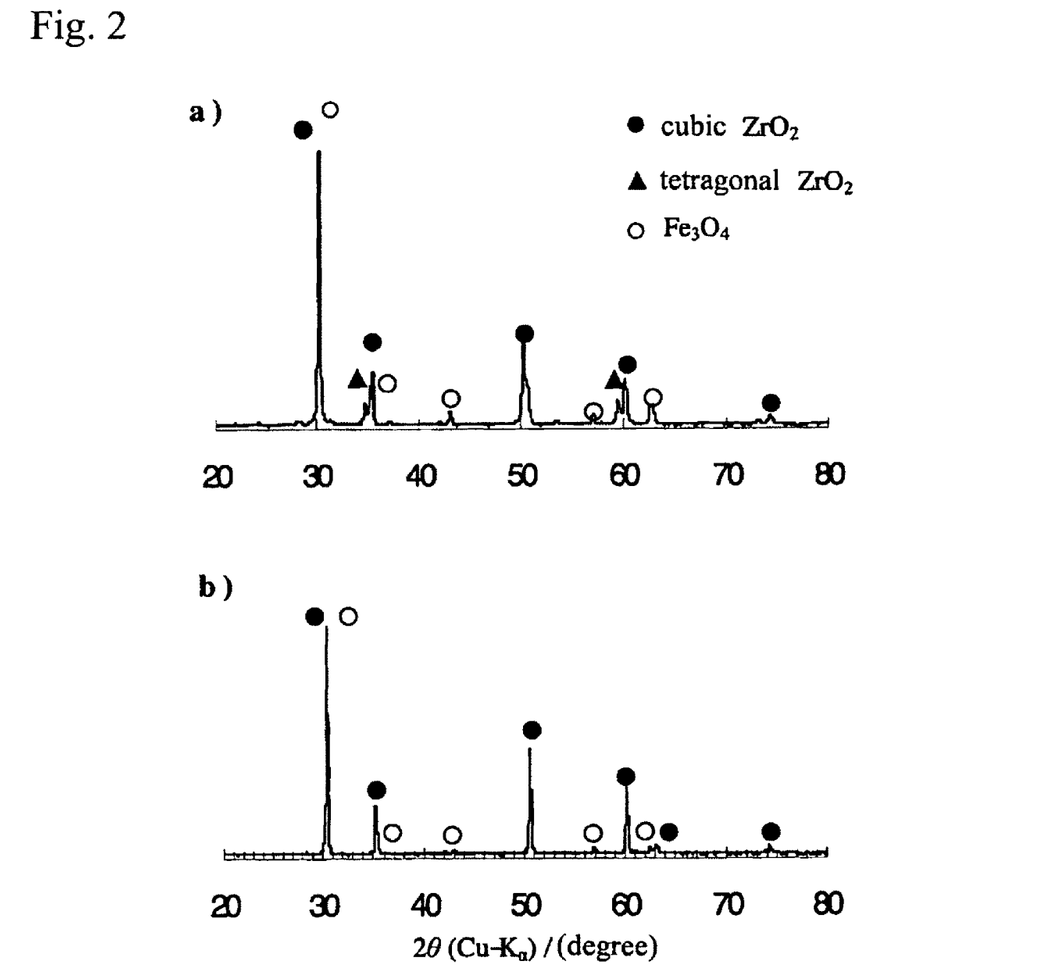
FIGS. 2(a) and 2(b) are graphs showing an X-ray diffraction (XRD) pattern in each reaction step.

FIGS. 2(a) and 2(b) show respective XRD patterns of the YSZ supporting 20 wt % of $Fe_3O_4$ in two reaction stages, wherein FIG. 2(a) shows an XRD pattern before initiation of the reaction, and FIG. 2(b) shows an XRD pattern after compleer of the high-temperature thermal reduction reaction at 1400° C.

As shown in FIGS. 2(a) and 2(b), a strong peak of a cubic $ZrO_2$ was observed together of a peak due to the reflection of $Fe_3O_4$. Further, a slight tetragonal crystal phase was observed in a part of the $ZrO_2$ phase of the YSZ.

For comparison, this YSZ-supported $Fe_3O_4$ and $Fe_3O_4$ itself without the YSZ support were thermally reduced at 1400° C.

After the thermal reduction, the YSZ-supported $Fe_3O_4$ was formed as porous pellets in the platinum cap. This pellet was easily crushed using the mortar, which was significantly effective in using for generating hydrogen in the subsequent water-decomposition reaction. In contract, the $Fe_3O_4$ without the YSZ support was severely sintered in the platinum cap, and formed as a dense, hard, candy-like glossy agglomerate. The agglomerate was attached onto a bottom surface of the platinum cap. It was assumed that the sample is molted once at the high temperature and then cooled and solidified again. The reason is that the thermal reduction reaction temperature of 1400° C. is close to a melting point (1370° C.) of the reduced $Fe_3O_4$ phase. This agglomerate was hardly crushed using the mortar, and therefore the subsequent water-decomposition reaction could not be performed using the $Fe_3O_4$ without the YSZ support. These test results show that the YSZ support can effectively suppress sintering of an iron oxide at high temperatures.

Figure 3:
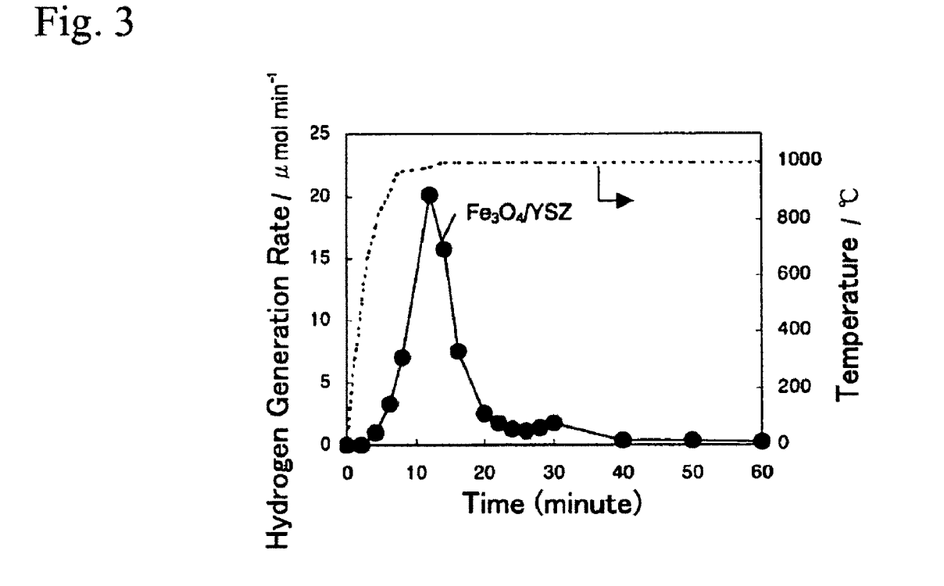
FIG. 3 is a graph showing a water-decomposition temperature and a hydrogen generation rate per gram of a reactive working material in the 1st cycle of a water-decomposition reaction.

FIG. 3 shows a hydrogen generation rate per gram of the sample and a water-decomposition temperature in the 1st cycle of the water-decomposition reaction, which represents a hydrogen generation profile in the water-decomposition reaction using the YSZ supporting $Fe_3O_4$ (20 wt %) thermally reduced at a reaction temperature of 1400° C. by plotting a hydrogen generation rate ($Ncm^3 \cdot min^{-1}$) per gram of the sample with respect to a reaction time.

Further, the two-step water-splitting reaction using the $Fe_3O_4$/YSZ reactive working material was repeated seven times to check repeatability of the cyclical reaction.

Figure 4:
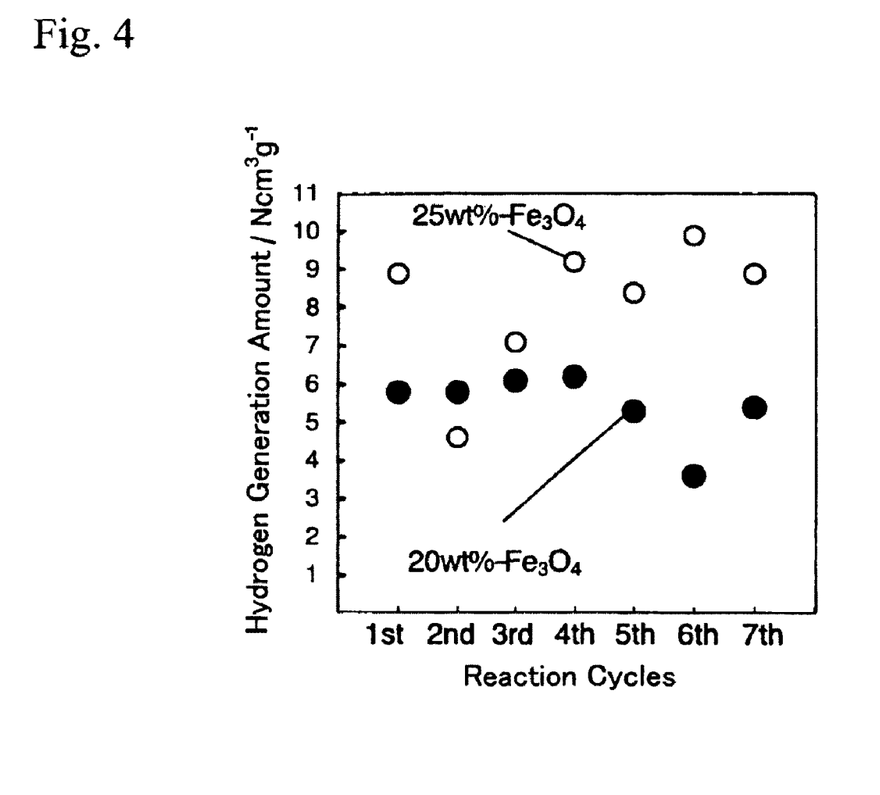
FIG. 4 is a graph showing a hydrogen generation amount per gram of the reactive working material in each cycle.

FIG. 4 shows a measurement result of a hydrogen generation amount per gram of the reactive working material sample in each cycle. The repeatability was checked using two samples having a $Fe_3O_4$ weight ratio of 20 wt % and 25 wt %. In FIG. 4, the sample having 20 wt % of $Fe_3O_4$ and the sample having 25 wt % of $Fe_3O_4$ are indicated by a black circle and a while circle, respectively. As seen in FIG. 4, a hydrogen generation amount in each of the samples is maintained at an approximately constant value even if the number of cycles is increased. Further, a hydrogen generation amount is drastically increased in most of the cycles by increasing the $Fe_3O_4$ weight ratio from 20 wt % to 25 wt %.

A rate of $Fe^{3+}$ in $Fe_3O_4$ which is reduced to $Fe^{2+}$ in the thermal reduction reaction will hereinafter be referred to as "$Fe_3O_4$ conversion rate". Then, the $Fe_3O_4$ conversion rate was roughly estimated on the assumption that "$Fe^{2+}$ generated through the thermal reduction reaction will be entirely re-oxidized to $Fe^{3+}$ through the water-decomposition reaction".

Table 1 shows a $Fe_3O_4$ conversion rate in each of the seven cycles of the thermal reduction reaction, according to the above rough estimation. As seen in Table 1, when 20 wt % of $Fe_3O_4$ is supported, 20 to 30% of the $Fe_3O_4$ phase is converted to a reduced phase. Further, when the content rate of $Fe_3O_4$ is increased to 25 wt %, the $Fe_3O_4$ conversion rate is increased to about 30 to 40%.

In Table 2, given that a sample having $Fe_3O_4$ supported on the YSZ is expressed as $Fe_3O_4$/YSZ; a sample having Co or Mn-doped $Fe_3O_4$ supported on the YSZ is expressed as $Co_xFe_{3-x}O_4$/YSZ or $Mn_xFe_{3-x}O_4$/YSZ; a sample having $Fe_3O_4$ supported on the CSZ is expressed as $Fe_3O_4$/CSZ; and a sample having $Fe_3O_4$ supported on the monoclinic zirconia is expressed as $Fe_3O_4$/monoclinic zirconia, respective hydrogen generation amounts ($Ncm^3 g^{-1}$) in these samples are compared with each other. While hydrogen is continuously generated in each of the samples, the hydrogen generation amount in the $Fe_3O_4$/monoclinic zirconia is sharply reduced in and after the 5th cycle. In contract, such a decrease in the hydrogen generation amount is not observed in the samples having the cubic zirconia support, i.e., the $Fe_3O_4$/YSZ and the $Fe_3O_4$/CSZ. The reason would be that grain growth due to the high-temperature reaction cycles is suppressed in the cubic zirconia-supported ferrite as compared with the monoclinic zirconia-supported ferrite.

Figure 5:
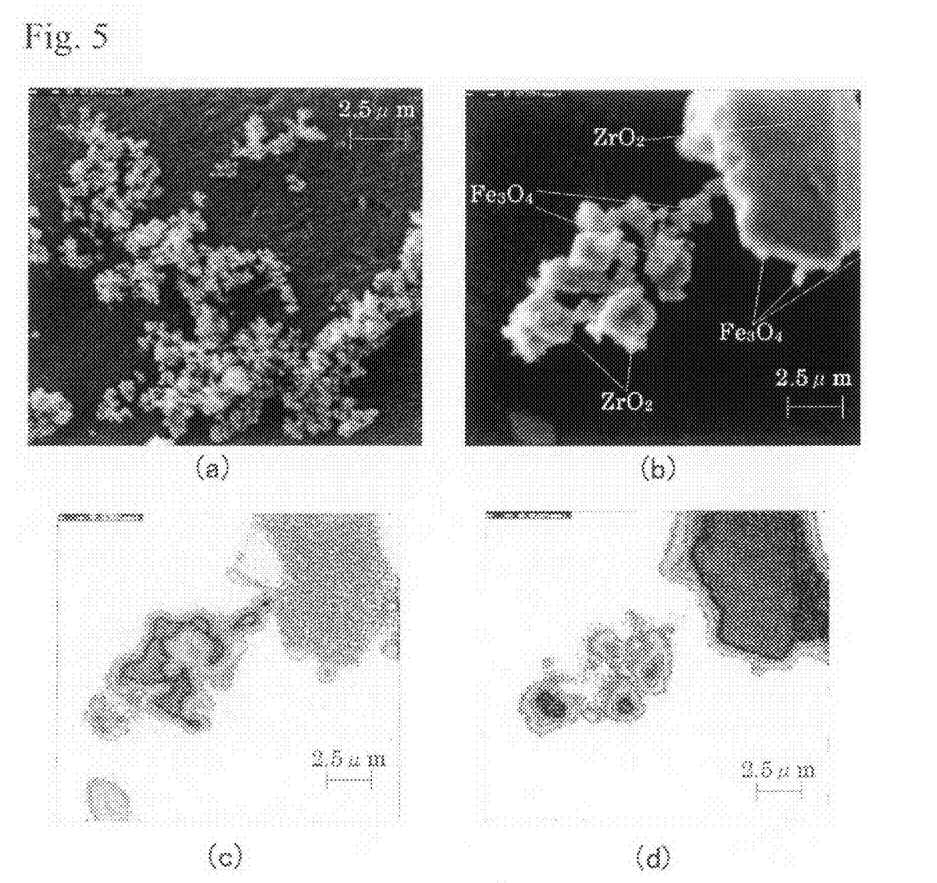
FIGS. 5(a) to 5(d) are scanning electron microscopic (SEM) images of an initial reactive working material and the reactive working material after the 7th cycle.
Figure 6:
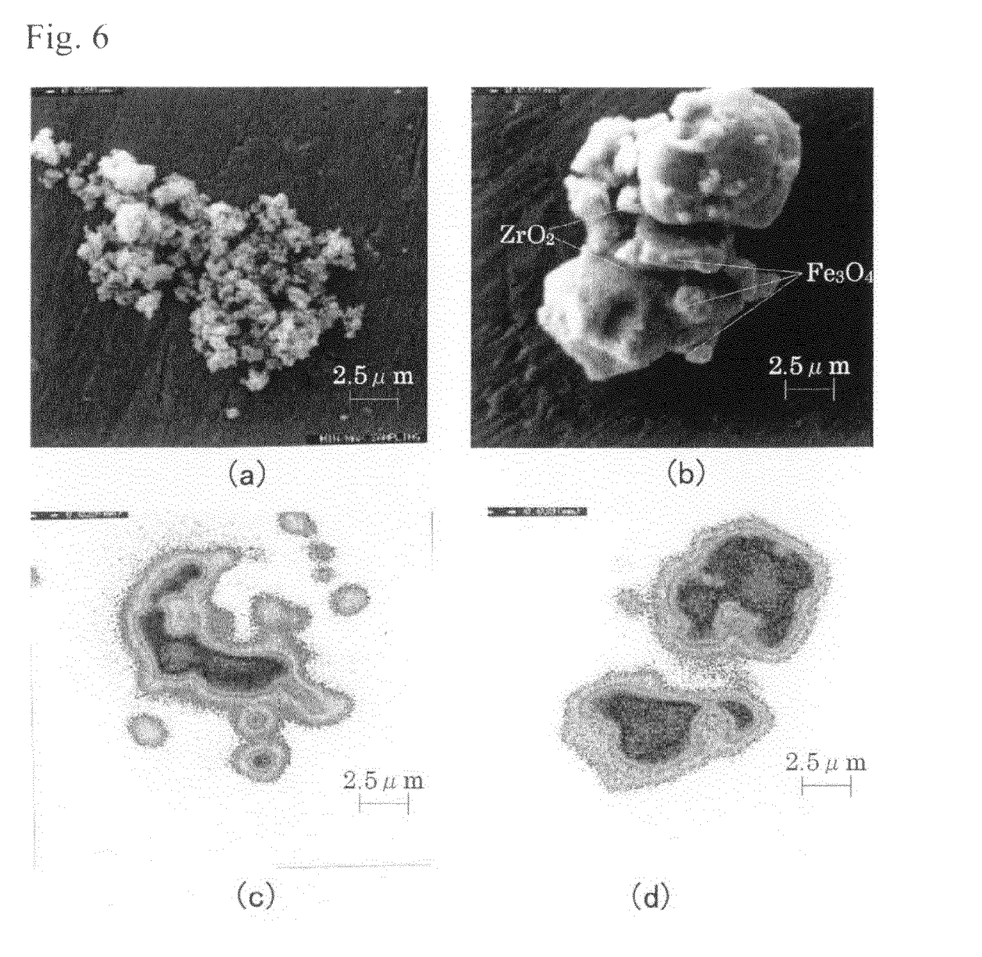
FIGS. 6(a) to 6(d) are SEM images of a monoclinic zirconia-supported reactive working material.

FIGS. 5(a) to 5(d) show an SEM image (×1000) of the $Fe_3O_4$/YSZ and element mappings of the sample after the 7th cycle using an electron probe microanalyzer (EPMA), wherein FIG. 5(a) shows the sample before the reaction, and FIG. 5(b) shows the sample after the 7th cycle. FIG. 5(c) is a photograph showing a Fe distribution, and FIG. 5(d) a photograph showing a Zr distribution.

FIGS. 6(a) to 6(d) show an SEM image of the $Fe_3O_4$/monoclinic zirconia and Fe and Zr distributions after the 6th cycle using the EPMA.

As is clear from the comparison between the SEM images in these figures, while a $Fe_3O_4$ grain in the $Fe_3O_4$/monoclinic zirconia grows to have a size equivalent to that of a $ZrO_2$ grain in the 6th cycle, such a large grain growth is not observed in the $Fe_3O_4$/YSZ even after the 7th cycle, and the $Fe_3O_4$ grain has a size of 2.5 µm or less. Further, it can be observed that there are many overlapped regions between the $ZrO_2$ and $Fe_3O_4$ distributions. This shows that a $Fe_3O_4$ fine powder is precipitated on a surface of the YSZ.

It is believed that the above result could be obtained by the following reason. Differently from the $Fe_3O_4$/monoclinic $ZrO_2$, in the $Fe_3O_4$/YSZ, a reduced ion is incorporated in a crystal structure of the YSZ during the thermal reduction reaction, instead of being formed as a FeO grain, and then precipitated as a $Fe_3O_4$ grain from the zirconia during the water-decomposition reaction, so that aggregation between FeO grains due to melting/solidification can be avoided.

Figure 7:
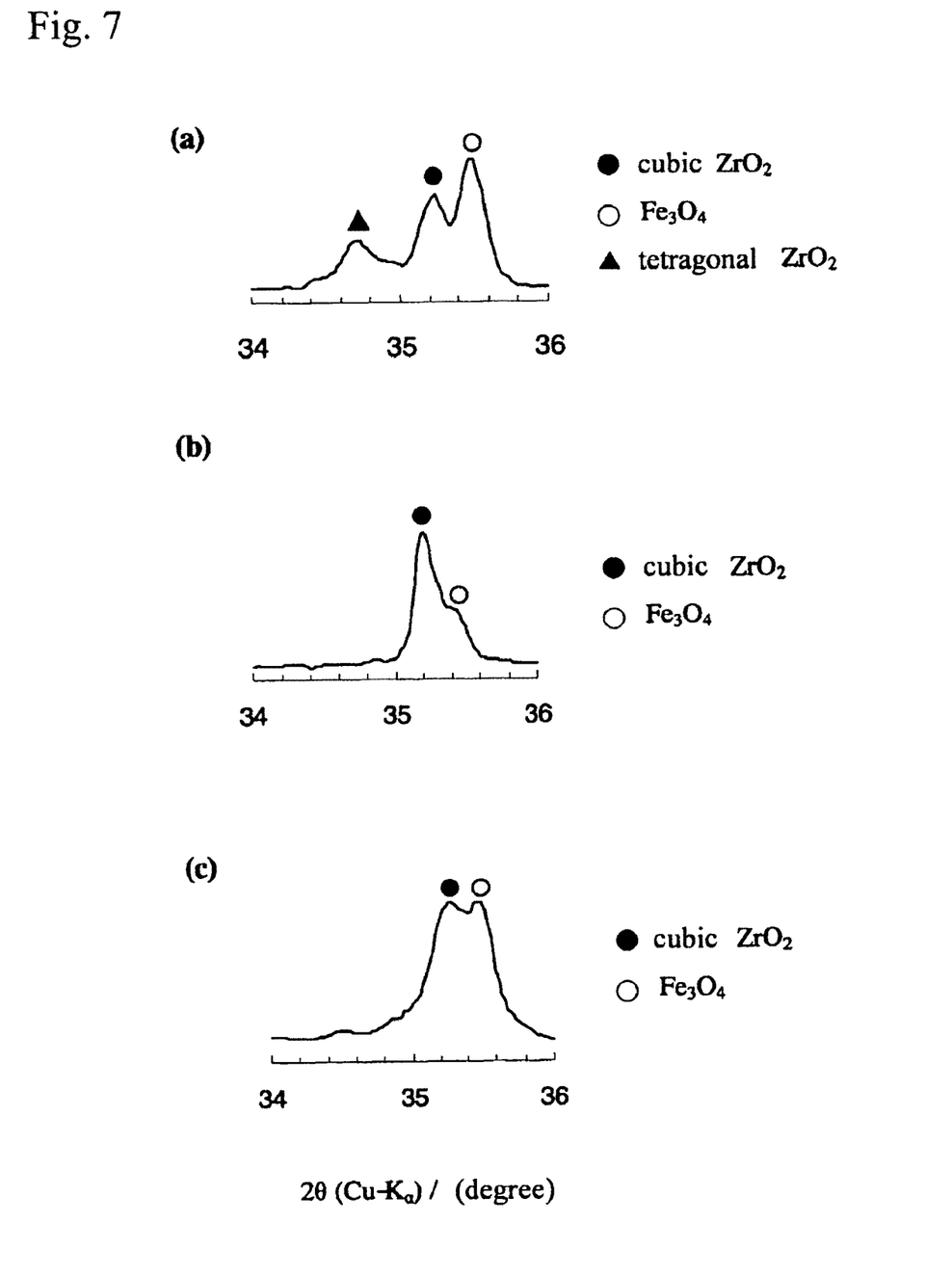
FIGS. 7(a) to 7(c) are graphs showing changes in $Fe_3O_4$ (311) face based on an XRD pattern in each reaction step.

FIGS. 7(a) to 7(c) show a peak due to the reflection of a $Fe_3O_4$ (311) face in an XRD pattern of the $Fe_3O_4$ (20 wt %)/YSZ during the water-decomposition reaction in each cycle, wherein: FIG. 7(a) shows an XRD pattern before the reaction; FIG. 7(b) shows an XRD pattern after the high-temperature thermal reduction reaction at 1400° C.; and FIG. 7(c) shows an XRD pattern after the water-decomposition reaction.

As shown in FIGS. 7(a) and 7(b), in the XRD pattern of the $Fe_3O_4$/YSZ after the thermal reduction reaction, the peak originated from the $Fe_3O_4$ (311) face becomes weaker than that of the $Fe_3O_4$/YSZ before the reaction. Further, after the thermal reduction reaction, no peak originated from the FeO is observed in the XRD pattern, and a weak peak of a tetragonal $ZrO_2$ disappears. That is, as seen in FIG. 7(b), in XRD pattern after the thermal reduction reaction, only a strong peak of cubic $ZrO_2$ and a weak peak of $Fe_3O_4$ are observed. Then, after the water-decomposition reaction, as seen in FIG. 7(c), the intensity of a peak originated from $Fe_3O_4$ is increased again.

As evidenced by the above result, during the thermal reduction reaction, the $Fe_3O_4$ reacts with the YSZ through release of oxygen, i.e., $Fe^{+2}$ penetrates into a cubic YSZ lattice to form a cubic $ZrO_2$ phase including $Fe^{+2}$ or $Fe^{+2}$ ion is incorporated in a cubic YSZ lattice, as is commonly known. Then, during the water-decomposition reaction, the $Fe^{+2}$-containing YSZ generates hydrogen through decomposition of water, to form a $Fe_3O_4$ phase on the YSZ support. This cyclical reaction may be roughly represented by the aforementioned formulas (1) and (2). It was also verified that a sample using CSZ has the same reaction mechanism represented by the aforementioned formulas (3) and (4).

TABLE 1

| Ferrite Ratio/ | Fe$_3$O$_4$ Conversion Rate/% | | | | | | |
|---|---|---|---|---|---|---|---|
| wt %-Fe$_3$O$_4$ | 1st | 2nd | 3rd | 4th | 5th | 6th | 7th |
| 20 | 27 | 27 | 29 | 29 | 25 | 17 | 25 |
| 25 | 34 | 18 | 28 | 36 | 33 | 38 | 34 |

TABLE 2

| Reactive working material | Temperature of Thermal Reduction Reaction/° C. | Hydrogen Generation Amount/Ncm$^3$g$^{-1}$ | | | | | | |
|---|---|---|---|---|---|---|---|---|
| | | 1st | 2nd | 3rd | 4th | 5th | 6th | 7th |
| Fe$_3$O$_4$ (20.3 wt %)/YSZ | 1400 | 6.9 | 5.5 | 7.9 | 6.6 | 5.4 | 6.7 | 7.8 |
| Fe$_3$O$_4$ (24.5 wt %)/YSZ | 1400 | 8.9 | 4.6 | 7.1 | 9.2 | 8.4 | 9.9 | 8.9 |
| Co$_{0.39}$Fe$_{2.61}$O$_4$ (19.5 wt %)/YSZ | 1400 | 6.4 | 2.9 | 8.3 | 5.4 | 8.4 | 7.5 | 5.4 |
| Co$_{0.68}$Fe$_{2.32}$O$_4$ (18.3 wt %)/YSZ | 1400 | 6.5 | 5.1 | 6.0 | 7.3 | 6.3 | 6.2 | 5.1 |
| Mn$_{0.68}$Fe$_{2.62}$O$_4$ (16.1 wt %)/YSZ | 14000 | 8.0 | 3.3 | 5.7 | 3.4 | — | — | — |
| Fe$_3$O$_4$ (23.4 wt %)/CSZ | 1400 | 5.5 | 6.2 | 6.7 | 5.3 | 5.7 | 7.2 | 6.6 |
| Co$_{0.38}$Fe$_{2.62}$O$_4$ (18.4 wt %)/CSZ | 1400 | 2.9 | 3.7 | 6.5 | 6.9 | 5.2 | — | — |
| Fe$_3$O$_4$ (20.0 wt %)/ monoclinic ZrO$_2$ | 1400 | 7.7 | 7.2 | 7.4 | 6.0 | 4.7 | 4.2 | — |

INDUSTRIAL APPLICABILITY

The applicant of this patent application previously disclosed an activity of a two-step water-splitting cycle using an iron-based oxide, i.e., ferrite, supported on a zirconia, in Japanese Patent Application No. 2003-060101. Specifically, it was disclosed that the ferrite supported on the zirconia can suppress aggregation and sintering, and thereby allows a two-step water-decomposition reaction to be repeatedly performed in a temperature cycle of 1000° C. and 1400° C. with enhanced reactivity as compared with a ferrite without a zirconia support. It was also disclosed that the occurrence of a phase change between Fe$_3$O$_4$ and FeO on a surface of the zirconia along with oxidation/reduction reactions of a solid phase is verified using an XRD.

The present invention is based on knowledge that a transition from Fe$^{3+}$ to Fe$^{2+}$ represented by the aforementioned formulas (1) and (2) or the aforementioned formulas (3) and (4) is observed in a ferrite supported on a cubic zirconia without formation of FeO grain.

In this reaction system, it is believed that Fe$^{2+}$ generated through the thermal reduction reaction penetrates into and exists in the cubic zirconia lattice instead of being formed as a FeO crystal, and therefore the melting of the FeO phase is suppressed during the thermal reduction reaction. Thus, in the cubic zirconia-supported ferrite, the melting/aggregation of the FeO phase at 1400° C. can be suppressed.

Further, as compared with a non-stabilized zirconia-supported ferrite, a fully-stabilized or partially stabilized zirconia-supported ferrite is more suitable for a cyclical reaction involving a temperature change in a high-temperature range. The reason is that, while the non-stabilized zirconia is changed from a monoclinic crystal phase to a tetragonal crystal phase due to such a temperature change, iron ions incorporated in the fully-stabilized or partially stabilized zirconia as a solid solution can stabilize a cubic crystal phase thereof to suppress a transition in the crystal phase due to the temperature change. When this zirconia-supported ferrite is fixed onto a ceramic foam to form a reaction device, a junction with the ceramic form is likely to have cracks due to volumetric changes caused by a transition in the crystal phase, and consequently scaling off of the zirconia-supported ferrite. It is expected that the fully-stabilized or partially stabilized zirconia can solve such a problem.

DESCRIPTION OF THE REFERENCE NUMERALS AND SIGNS

1: infrared furnace
2: platinum cup
3: solid sample
4: silica tube
5: R-type thermocouple

What is claimed is:

1. A reactive working material for use in a two-step thermochemical water-splitting cycle, said reactive working material comprising a ferrite and a zirconia supporting said ferrite, wherein said ferrite-supporting zirconia is a cubic zirconia.

2. The reactive working material as defined in claim 1, wherein said cubic zirconia contains yttria or calcia in an amount of 2 mol % or more.

3. The reactive working material as defined in claim 1, wherein said ferrite-supporting cubic zirconia is a composite powder of a ferrite fine powder having a particle size of 10 μm or less and a zirconia fine powder having a particle size of 10 μm or less.

4. The reactive working material as defined in claim 1, wherein said ferrite-supporting cubic zirconia comprises a cubic zirconia porous ceramics body having a porous structure coated with a ferrite fine powder having a particle size of 10 μm or less.

5. A method of preparing a reactive working material for use in a two-step thermochemical water-splitting cycle, which comprises a ferrite and a cubic zirconia supporting said ferrite, said method comprising:
dispersing a fully-stabilized or partially-stabilized cubic zirconia fine powder having a particle size of 10 μm or less, in an aqueous Fe(II) salt solution, and adding an aqueous alkali hydroxide solution to said zirconia fine powder-dispersed aqueous solution to form a Fe (II) hydroxide colloid therein;
bubbling air in said colloid-containing aqueous solution to oxidize the Fe(II) hydroxide colloid; and
promoting a dissolution-precipitation reaction Where the Fe(II) hydroxide colloid is dissolved in the, zirconia fine powder-dispersed aqueous solution and then precipitated as Fe$_3$O$_4$, so as to grow Fe$_3$O$_4$ on the dispersed cubic zirconia fine powder.

6. A method of preparing a reactive working material for use in a two-step thermochemical water-splitting cycle, which comprises a ferrite and a cubic zirconia supporting said ferrite, said method comprising:
dispersing a fully-stabilized or partially-stabilized cubic zirconia fine powder in an aqueous solution of a metal salt of Fe(II);
evaporating and drying the mixture; and
burning the dried mixture to allow the metal salt on the zirconia to be decomposed to the ferrite; and
heating the ferrite at a temperature of 300° C. or more.

7. A hydrogen production process based on a two-step thermochemical water-splitting cycle comprising contacting water with a reactive working material which comprises a ferrite and an yttria fully-stabilized or partially-stabilized cubic zirconia supporting said ferrite, said process comprising two steps expressed by the following reaction formulas:

$$x/3Fe_3O_4 + Y_yZr_{1-y}O_{2-y/2} = Fe_xY_yZr_{1-y}O_{2-y/2+x} + x/6O_2;$$
and
$$Fe_xY_yZr_{1-y}O_{2-y/2+x} + x/3H_2O = x/3Fe_3O_4 + Y_yZr_{1-y}O_{2-y/2} + x/3H_2.$$

8. A hydrogen production process based on a two-step thermochemical water-splitting cycle comprising contacting water with a reactive working material which comprises a ferrite and a calcia fully-stabilized or partially-stabilized cubic zirconia supporting said ferrite, said process comprising two steps expressed by the following reaction formulas:

$$x/3Fe_3O_4 + Ca_yZr_{1-y}O_{2-y} = Fe_xCa_yZr_{1-y}O_{2-y+x} + x/6O_2;$$
and
$$Fe_xCa_yZr_{1-y}O_{2-y+x} + x/3H_2O = x/3Fe_3O_4 + Ca_yZr_{1-y}O_{2-y} + x.$$

* * * * *